Dec. 8, 1925.

H. L. CLABAUGH

FENDER OR BUMPER

Filed March 23, 1925  2 Sheets-Sheet 1

1,564,467

Inventor
Henry L. Clabaugh
By John A. Bernhardt
Attorney

Dec. 8, 1925.

H. L. CLABAUGH 1,564,467

FENDER OR BUMPER

Filed March 23, 1925    2 Sheets-Sheet 2

Inventor
Henry L. Clabaugh

By John A. Bomhardt
Attorney

Patented Dec. 8, 1925.

1,564,467

UNITED STATES PATENT OFFICE.

HENRY L. CLABAUGH, OF CLEVELAND, OHIO.

FENDER OR BUMPER.

Application filed March 23, 1925. Serial No. 17,649.

*To all whom it may concern:*

Be it known that I, HENRY L. CLABAUGH, a citizen of the United States, residing at Cleveland, in the county of Cuyahoga and State of Ohio, have invented certain new and useful Improvements in Fenders or Bumpers, of which the following is a specification.

This invention relates to improvements in fenders or bumpers for street cars, automobiles or the like.

The primary object is to provide a fender which will prevent a person struck thereby from being thrown beneath a vehicle and further to so construct the fender as to minimize the extent of injury to the person.

It is likewise an object to provide a highly efficient fender readily adaptable to any of the usual types of automobiles and so constructed that it will possess unusual resiliency throughout.

Other objects will be in part obvious and in part pointed out hereinafter.

In order that the invention and mode of operation may be readily understood by those skilled in the art, I have in the accompanying illustrative drawings and detailed description thereof pointed out one possible embodiment of the same.

Similar characters of reference designate similar parts throughout the following specification and accompanying drawings.

Figure 5:
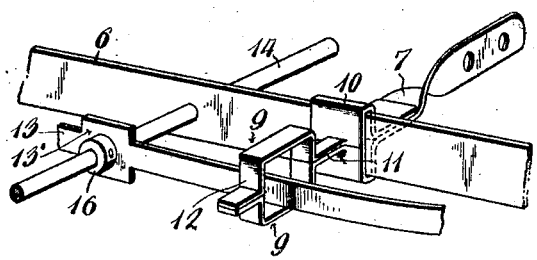
Figure 5 is a detail perspective view of the supporting arms, guide loops, and adjacent elements.

This fender includes a main or supporting frame which as shown consists of a relatively wide bar 6 connected by means of brackets or arms 7 to the chassis 8 of an automobile. Each bracket or connecting arm 7 is made up of a pair of substantially identically formed members 9 as shown in Figure 5. A relatively long narrow loop portion 10 fits snugly about the supporting bar 6 and has a neck portion 11 extending forwardly a short distance whereat it is widened to form a guide loop 12. The other end is apertured for reception of bolts (not shown) by means of which connection between the arm and chassis is effected. The provision of a pair of these guide loops 12 serves to retain the bar 6 and a curved or bowed spring member 13 in horizontal alinement and permits movement of the spring member 13 toward the bar 6 at certain times. It is apparent in Figures 2 and 5 that these loops also serve to limit the relative movement of the spring member 13 and the main supporting bar 6, that is, horizontal movement of the spring member 13 cannot extend a distance greater than the length of these loops.

Figure 2:
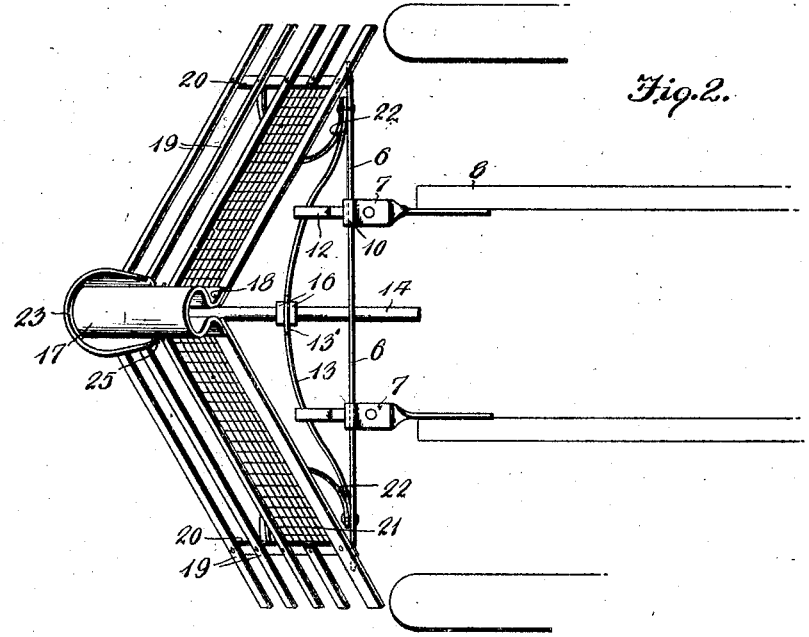
Figure 2 is a top plan view showing its relation to an automobile upon which it is mounted.
Figure 3:
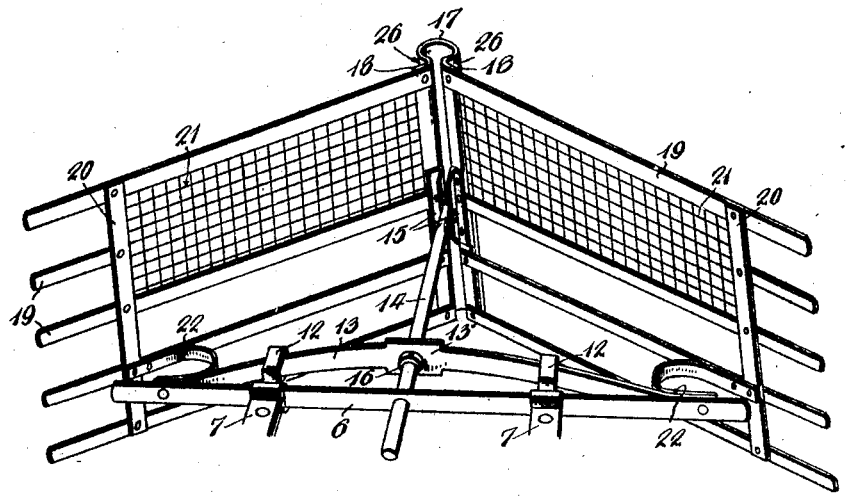
Figure 3 is a perspective view showing the relation of the main frame and the buffer.
Figure 4:
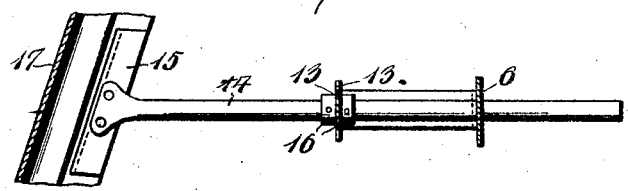
Figure 4 is a sectional view showing the stiffening or supporting rod connection between the main frame and the buffer.

As shown in Figures 2, 3, and 4, a supporting or stiffening rod or bar 14 has one end portion slidably mounted in the main supporting bar 6 while its other end is fixed between attaching plates 15 carried by a substantially V-shaped buffer portion. The aforementioned spring member 13 is arranged between the bar 6 and the attaching plates 15 and is fixed to the supporting rod 14 by means of spaced collars 16 which are pinned to the rod as clearly shown in Figure 4. The provision of a supporting rod as shown prevents undue relative movement of the buffer and the remaining structure.

Figure 1:
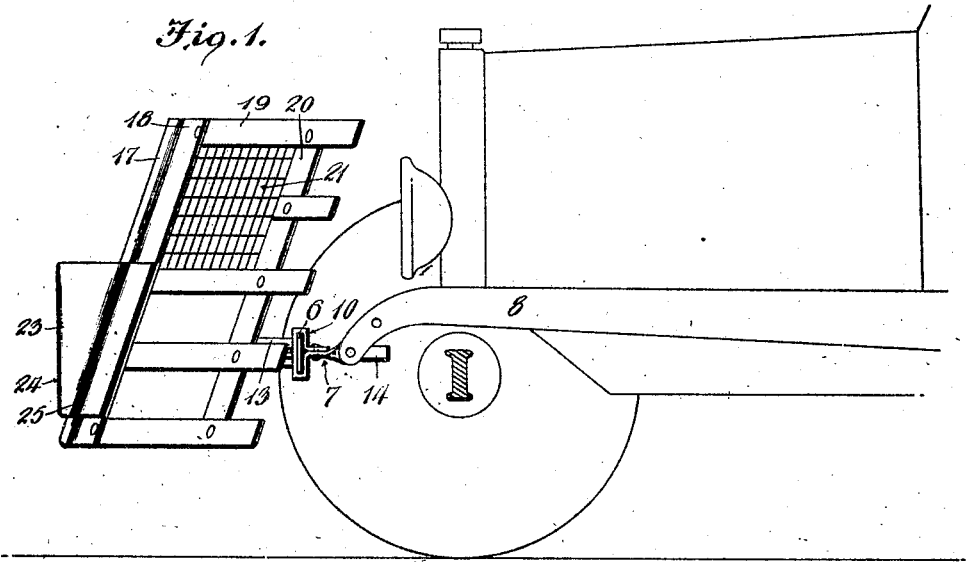
Figure 1 is a side elevation illustrating the application of my improved fender or bumper to the forward end of an automobile.

The main supporting bar 6 and the connecting rod 14 are arranged rearwardly of the buffer which as shown comprises a central tubular member 17 and is provided with outwardly directed flanges 18 to which the inner ends of the buffer bars 19 are riveted or otherwise attached. These buffer bars 19 are constructed of any preferred material and are held in parallel relation by means of vertical brace bars 20 as shown in Figure 3. Obviously projection of light rays from the headlights would be interrupted by the upper buffer bars carried by the central supporting member 17, in view of which I substitute a light wire structure 21 as shown in Figures 1 and 3. Through this arrangement the headlights will be permitted to function in the usual manner. The ends of the wing portions of the buffer are supported by the main bar 6 through interposed substantially U-shaped spring arms 22 as clearly indicated in Figure 3. These curved arms 22 have their inner ends riveted or otherwise secured to the main bar 6 at the point of connection between this bar 6 and the spring member 13. It will be noted in Figure 3 that this spring member 13 is in the form of a long flat curved strip whose central portion 13' is enlarged to provide a sufficient bearing through which the aforementioned connecting rod 14 may extend.

To prevent the tendency the buffer may have to plow under another vehicle, I arrange upon the central member 17 a shoe 23 as shown in Figure 1. This shoe 23 is of sheet metal construction and as will be noted the bumper face 24 is arranged vertically whereas the face of the central member 17 to which it is riveted is inclined upwardly and toward the vehicle. Attaching flanges 25 are formed upon the shoe 23 and snugly fit into the opposed channels or guide ways 26 which result from the formation of the outwardly directed flanges 18 to which the buffer bars 19 are attached. As indicated in Figure 2 the wings of the buffer terminate at points adjacent the front wheels and due to the rearward inclination, will deflect a person or object to one side of the vehicle. Due to the yieldability of the entire structure the force of impact will be materially decreased and consequently the extent of injury to a person struck will be minimized. It is obvious that the curved spring members 22 as well as the buffer bars 19 will yield to a considerable degree before the bar 6 and spring member 13 will be flexed. Should the buffer or the shoe strike another vehicle or relatively stationary object the connecting rod 14 with the spring member 13 will be moved rearwardly until the spring member has reached the innermost end of the guide loops 12. At this point the bar 6 will flex with the spring member 13 and the short curved arm 22 and pressure will then be exerted directly upon the end of the chassis 8. Obviously this spring construction serves as a cushion or shock absorber and materially decreases damage resulting from a collision.

Manifestly, certain changes in the minor details of construction may be resorted to, and such of these changes as may fall within the scope of the appended claims, I consider within the spirit of my invention.

I claim:—

1. A buffer for a fender of the character described comprising, an upwardly rearwardly inclined central support, said support being tubular and having rearwardly inclined attaching flanges, and rearwardly diverging wing portions secured to said flanges.

2. A fender of the character described comprising, a transverse supporting bar, a substantially V-shaped buffer arranged in advance of the supporting bar, a forwardly bowed spring bar disposed between the bar and buffer and having its ends connected to the end portions of the supporting bar, and a connecting rod retaining the spring bar and buffer in fixed relation and having slidable connection with the supporting bar.

3. A fender of the character described comprising, a transverse supporting bar, a substantially V-shaped buffer arranged in advance of the supporting bar, a forwardly bowed spring bar disposed between the supporting bar and buffer and having its ends connected to the end portions of the supporting bar, curved spring arms interconnecting the end portions of the buffer and supporting bar, and a connecting rod having one end fixed centrally to the buffer and extending rearwardly through the bowed spring bar and transverse supporting arm, said connecting rod being fixed for movement with the spring bar.

4. A fender of the character described comprising, a transverse supporting bar, a substantially V-shaped buffer arranged in advance of the supporting bar, a forwardly bowed spring bar disposed between the supporting bar and buffer and having its ends connected to the end portions of the supporting bar, guide loops carried by the transverse supporting bar and encircling portions of the spring bar to limit relative movement between the bars, and a connecting rod fixed to the buffer and spring bar and slidable through the supporting bar.

5. A fender of the character described comprising, a transverse supporting bar, a substantially V-shaped buffer arranged in advance of the supporting bar, a forwardly bowed spring bar disposed between the supporting bar and buffer and having its ends connected to the end portions of the supporting bar, guide loops carried by the transverse supporting bar and encircling portions of the spring bar to limit relative movement between the bars, and a connecting rod fixed to the buffer and spring bar and slidable through the supporting arm, and spring means interconnecting the end portions of the buffer and transverse supporting bar.

6. A fender of the character described comprising, a transverse supporting bar, a buffer arranged in advance of the supporting bar, said buffer including an upwardly rearwardly inclined central support, a pair of rearwardly diverging wings, spring means inter-connecting the wings and end portions of the supporting bar, and a yieldable connection between the supporting bar and central support of the buffer.

7. A fender of the character described comprising, a transverse supporting bar, a buffer arranged in advance of the supporting bar, said buffer including an upwardly rearwardly inclined central support, a pair of rearwardly diverging wings, spring means inter-connecting the wings and end portions of the supporting bar, a forwardly bowed spring bar disposed between the supporting bar and buffer, and a connecting rod fixed to the central support of the buffer and the spring bar and slidable through the transverse supporting bar.

8. A fender of the character described comprising, a transverse supporting bar, a buffer arranged in advance of the supporting bar, said buffer including an upwardly rearwardly inclined central support, a pair of rearwardly diverging wings, spring means inter-connecting the wings and end portions of the supporting bar, a forwardly bowed spring bar disposed between the supporting bar and buffer, a connecting rod fixed to the central support of the buffer and the spring bar and slidable through the transverse supporting bar, and guide loops carried by the supporting bar and encircling portions of the forwardly bowed spring bar to limit relative movement of said bars.

9. A buffer for a fender of the character described, comprising, a tubular central supporting member having rearwardly inclined attaching flanges, and rearwardly diverging wing portions secured to said flanges, said wings each comprising vertical and horizontal crossed interconnected bars.

In testimony whereof, I affix my signature.

HENRY L. CLABAUGH.